Feb. 19, 1957     P. M. MARTIN     2,782,249
SUBMARINE CABLE
Filed March 18, 1950     3 Sheets-Sheet 1
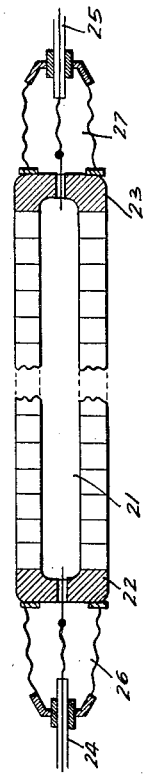
FIG.3
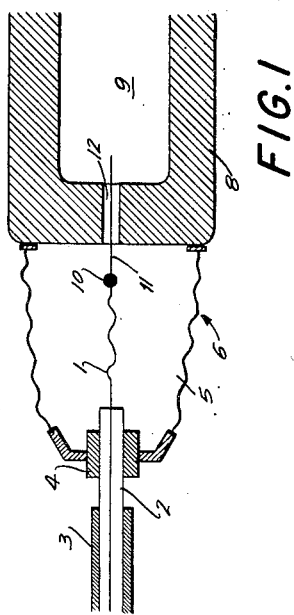
FIG.1
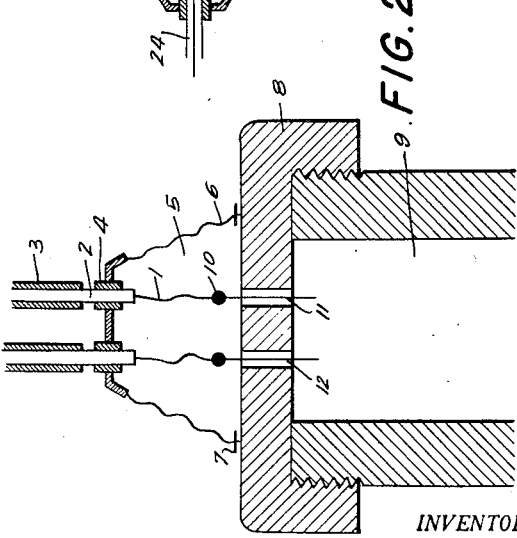
FIG.4
FIG.2
INVENTOR.
Paul Marcel Martin
BY Michael S. Striker Feb. 19, 1957 — P. M. MARTIN — 2,782,249
SUBMARINE CABLE
Filed March 18, 1950 — 3 Sheets-Sheet 2
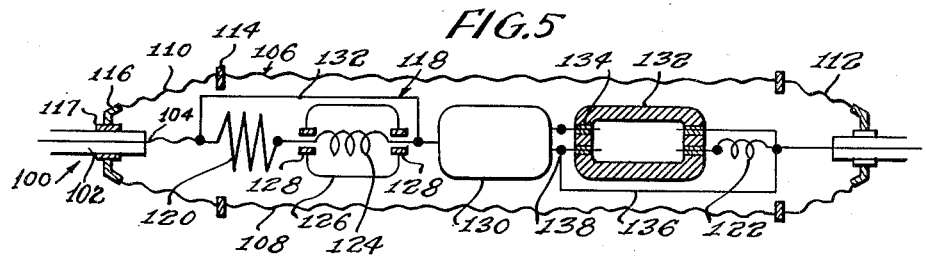
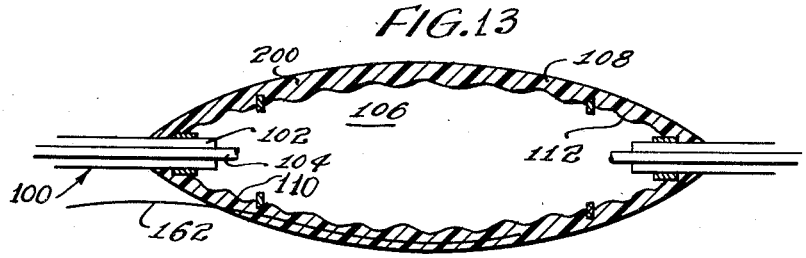
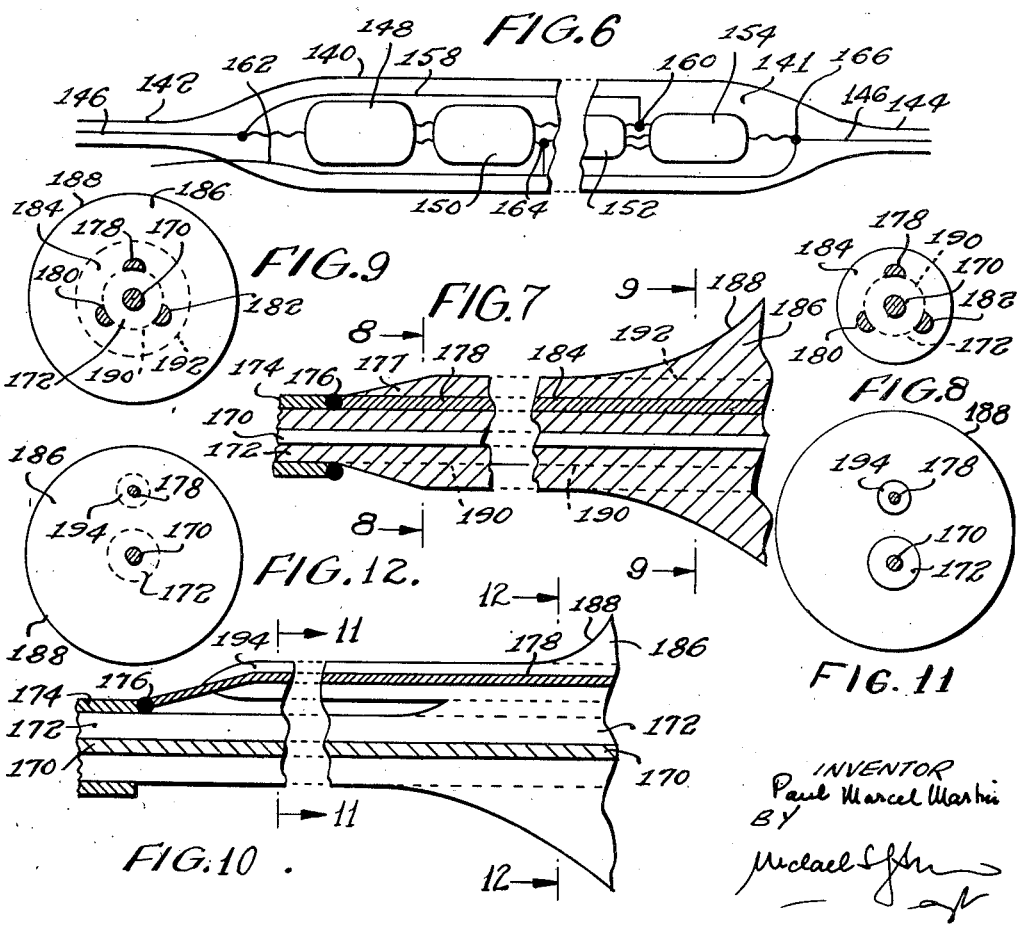

Feb. 19, 1957 P. M. MARTIN 2,782,249
SUBMARINE CABLE
Filed March 18, 1950 3 Sheets-Sheet 3

INVENTOR
Paul Marcel Martin
BY
Michael J. Quinn

United States Patent Office 2,782,249
Patented Feb. 19, 1957

2,782,249

SUBMARINE CABLE

Paul Marcel Martin, Paris, France

Application March 18, 1950, Serial No. 150,392
In France June 13, 1944

Section 1, Public Law 690, August 8, 1946
Patent expires June 13, 1964

14 Claims. (Cl. 174—70)

This application is a continuation-in-part of my U. S. patent application Serial No. 624,271, filed Oct. 24, 1945, now Patent No. 2,539,310, and entitled Inlet Means For an Insulation Covered Electric Conductor.

The present invention relates to various apparatus operating under pressure especially sub-marines, telephonic repeaters, and, more particularly the arrangement of the cable inlets and the housings containing the several apparatus, the whole being designed to ensure the relay of electric currents transmitted by the cables.

In the hitherto known arrangements the cables are put up in a thickly walled chamber, capable of resisting the water pressure at the bottom of the sea, this chamber being filled with air at low pressure. The cores of the cables enter this chamber by means of intermediate devices, preventing the sea water under high pressure from entering the chamber, this being more particularly due to the interposition of plastic and fluent parts, such as rubber or para-rubber. The obtaining pressures being as high as several hundreds of kilograms per square centimeter, the use of these plastic and fluent matters resulted in complex and fragile devices.

Certain of these devices were lodged in rigid metallic parts having a length of several centimeters. The passage of these rigid metallic parts to the various drums constituting the line of the cable aboard the ship for laying the repeaters occasioned serious difficulties.

According to the invention, the cable entrance to the low pressure chamber is realized by using an intermediate high pressure ante-chamber, and the invention includes the application of this principle to the repeater housing types which are already known. It likewise includes various new housing types which, in addition to this or similar intake arrangements, present other particular features, and it finally comprises various devices concerning the repeater apparatus proper.

The present invention has for its object to provide a submarine cable which is provided with repeater units which are effectively protected against the entering of sea water.

It is a further object of the present invention to provide a submarine cable having a conductor and a core of dielectric material which is connected to a repeater arranged in a housing which is associated with plastic material, an earthing wire penetrating said material for a length which exceeds to an appreciable extent the linear distance over the end of the housing to the adjacent end of the dielectric material.

It is a further object of the present invention to enclose the housing of the repeater in a sheath of plastic material which is bonded to the dielectric or surrounding the conductor of the cable, an earthing wire extending in said sheath over a path substantially in excess of the linear distance of the end of the housing from the adjacent end of the dielectric material.

These and other objects of the invention are attained by mechanism described and illustrated, by way example, in the accompanying drawing, similar numerals referring to similar parts throughout the several views, and in which:

Fig. 1 diagrammatically illustrates the manner in which a cable is connected to an ante-chamber according to the present invention;

Fig. 2 illustrates the manner in which two parts of a submarine cable enter into the housing of a repeater;

Fig. 3 shows the manner in which two ends of a submarine cable enter into a supple repeater housing;

Fig. 4 shows a repeater having extended ante-chambers;

Fig. 5 shows a plurality of elements arranged within a supple repeater housing and the manner in which the cable is joined to this housing;

Figure 14:
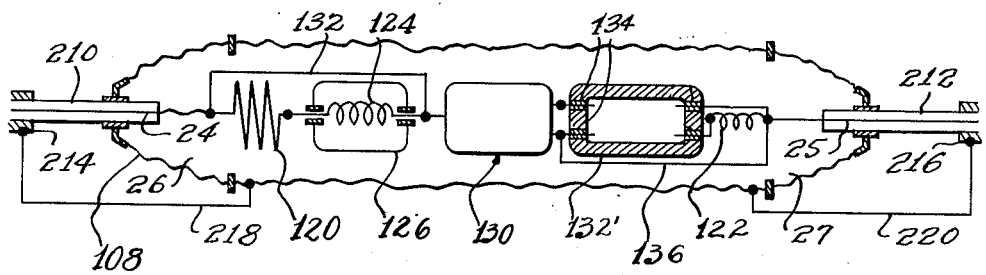
Figure 15:
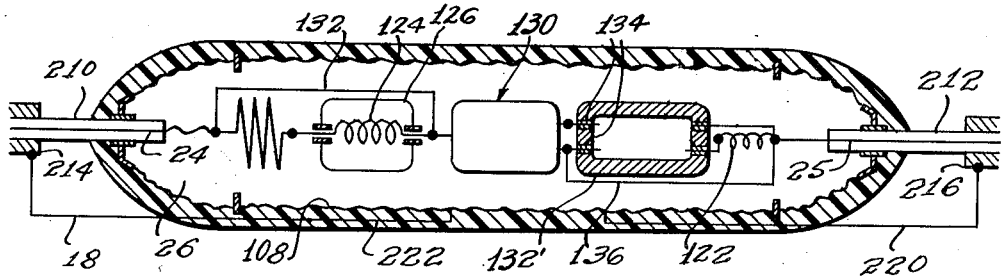
Figure 16:
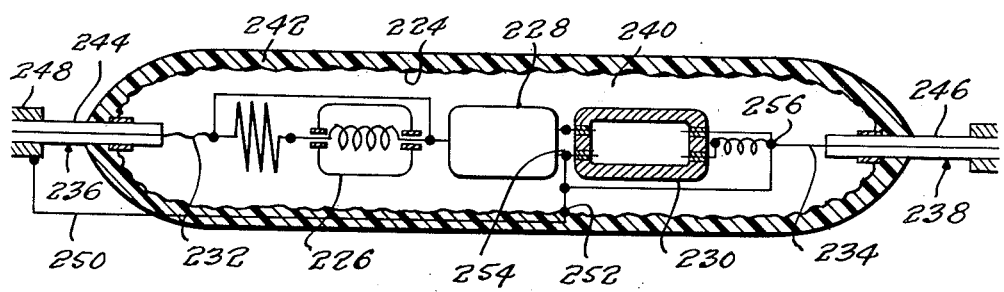

Fig. 6 diagrammatically illustrates the manner in which an earthing wire is joined to a repeater which is connected to a cable according to the present invention;

Fig. 7 is a longitudinal fragmentary illustration of one possible structure for connecting an earthing wire to the repeater as well as to the outer covering of the cable;

Figs. 8 and 9 are respectively transverse sectional views taken along lines 8—8 and 9—9 of Fig. 7 in the direction of the arrows;

Fig. 10 is a fragmentary longitudinal sectional view illustrating another manner of connecting one or more earthing wires to the repeater and to the outer covering of the cable;

Figs. 11 and 12 are respectively transverse sectional views taken along lines 11—11 and 12—12 of Fig. 10 in the direction of the arrows;

Fig. 13 shows a repeater housing having an outer plastic covering with an earthing wire embedded in the plastic;

Fig. 14 shows the structure of Fig. 5 with earthing wires connected thereto;

Fig. 15 shows the structure of Fig. 14 provided with an outer plastic covering for the repeater housing and having the earthing wires embedded in the plastic covering; and Fig. 16 shows an arrangement similar to Fig. 15 with the earthing wire extending into the interior of the repeater housing and connected to the elements therein.

Fig. 1 shows a high pressure intake ante-chamber according to the invention. The core of the sub-marine cable, comprising the central conductor 1 and the insulating body 2, is stripped of its return conductor 3, and penetrates through a stuffing box 4 in an ante-chamber 5. This ante-chamber is closed in by a bell 6 preferably consisting of copper and having thin, deformable walls and connected by means of a soldered tight joint 7 to the terminal wall 8 of the thick-walled low pressure chamber 9 containing the amplifying apparatus.

In the interior of the ante-chamber the central conductor is stripped of its insulating body 2.

The ante-chamber is filled with a matter having essentially the following properties: it is but little compressible, a good electric insulator, does not attack the various matters contacting therewith, moistens the walls of the ante-chamber and does not harden at the temperature obtaining at the bottom of the sea.

This body may be liquid, pasty or plastic. Specific examples of the material of this body are as follows:

Hydrocarbon oils, liquid organic silicon compounds, polyisobutylene of low molecular weight, phosphoric esters, heavy phtalates, and non-migratory polyesters. If the antechamber consists of polythene, the liquid for equalizing the pressure is preferably chosen among the organic silicon compounds and the polyisobutylenes of low molecular weight.

It is also possible to make use of a heterogeneous body that may, for example, be pasty in the center of the chamber and liquid in proximity of the walls. One of the rules to follow in the choice of the physical properties of the body to be employed can be determined by its filling-in method such as, for example, if the filling shall be effectuated by means of spigots, a liquid filler will preferably be selected. This body will be referred to hereafter as ante-chamber liquid.

Due to the suppleness of the wall 6, the ante-chamber liquid is constantly under a near equilibrium pressure to that of the outer constituent. The stuffing box 4, being pressed against the insulant of the core, will therefore not be subjected to serious pressure differences: it may, for example, be built like an ordinary stuffing box, its pressure exerted on the insulant is low, the area upon which pressure exerted is small, and the insulant will not flow at this point.

The central conductor 1 is connected at point 10 to a metallic conductor 11 passing through an opening 12 provided for this purpose, in the wall of the low pressure chamber. If this wall is electrically conductive, the opening is sealed by means of a body having the following for its object: It insulates the conductor 11 from the wall through which it passes and it prevents the liquid in the ante-chamber from penetrating into chamber 9. This body may, for example, be vitreous, examples of which have been given hereinabove. If the wall should not be electrically conductive the function of this body would be accordingly simplified. It may even be dispensed with, if the nature of the wall is such as to allow the conductor to be taken in its mass, such as for example, in the case of a wall made of a vitreous substance.

The passage 12 is illustrated schematically in Fig. 1.

This entrance device of the cables into the repeaters may be made use of in connection with the heretofore known types of housings.

Figs. 2 and 3 illustrate examples of such adaptations.

Fig. 2 shows the entry of the two parts of a submarine cable into the housing of a rigid repeater, i. e. a repeater having its amplifying apparatus in a rigid thick walled box. Each of the two cores 1 penetrates through a stuffing box 4 into a common ante-chamber 9 where they are connected to two individual conductors 11 extending through two openings 12 provided in the wall 8.

The general arrangement of the repeater may be realized in different ways, as will be explained hereafter.

The repeater illustrated in Fig. 2 has the general appearance of a Pupin pot in that the two cable ends enter the box containing the several apparatus side by side through the cover, this box being filled with air under low pressure.

The profile and connections of the parts constituting the walls of the chamber 9 are shown schematically. In view of the establishment of the housing, the hereafter described means and ways will preferably be followed, this more particularly in connection with the boxes 41 and 42 shown in Fig. 5.

In Fig. 3 is shown the entrance of the two ends of a submarine cable into a supple repeater housing of an already known type; the term supple repeater being held to designate a repeater having its amplifying apparatus arranged within a flexible envelope, capable of resisting the pressure at the bottom of the sea.

The housing 21 is shown schematically; it is closed at both ends by rigid thick walls 22 and 23, respectively: the cores 24 and 25 of each of the cable ends protrude into the high pressure ante-chambers 26 and 27, respectively, and from here into the housing 21 by extending through the walls 22 and 23.

Figs. 4 and 5 each show a supple repeater housing in which the application and extension of the hereabove set forth principle has led to the partial or total elimination of the thick walled supple envelope capable of resisting the pressure exerted thereon.

Before describing these arrangements in more detail the following may be recalled.

The elements constituting the apparatus can be divided in two categories, namely (a) those being formed with an enclosure under vacuum or which must operate in the air and (b) those that are adapted to operate under high pressure.

The first category comprises more particularly the thermionic tubes.

The second category includes, for example, the fixed or adjustable resistance and inductance coils.

Fig. 4 shows a repeater in which the ante-chambers for the cable are filled with an ante-chamber liquid and have been extended to the detriment of the low pressure chamber.

The cores 24 and 25 of each of the cable ends extend into the high pressure ante-chambers 26 and 27, respectively. The edges of each of the bells built with thin and deformable walls, delimiting the ante-chambers, are secured by soldering either to one of the terminal parts 22 and 23 of the low pressure chamber or to cylindrical tube elements with thin and deforable walls. In Fig. 4 it has been supposed, by way of example, that the ante-chamber 26 has been extended by two tube elements 28 and 29 preferably consisting of copper and ante-chamber 27 by a tube element 30; the edges of the elements 29 and 30 are secured to the terminal parts 22 and 23. The relative fixation of the edges of the ante-chambers and tube elements to the terminal parts 22 and 23, respectively, is attained by means of tight joints, analogous to joint 7 (Fig. 1).

The whole, formed by an ante-chamber and the adjacent tubes, is filled with the ante-chamber liquid as hereabove described, liquid which enters into a pressure equilibration with the outer medium; the amplifier elements of the second category are placed in this liquid.

Several of these second category elements are shown schematically by way of example; the elements 31 and 32 are immersed in the liquid; the element 33 is enclosed in a box 34 having thin and deformable walls and being filled with a liquid that may be different from the ambient liquid. The connections of this element 33 penetrate into the box 34 and pass through stuffing boxes 35 and 36 having for their object if necessary to electrically insulate the connections from the body of the box 34, and prevent a possible mixing of the two liquids, the latter being under substantially the identical pressure. The stuffing boxes may be short and exert but a low pressure. Only two stuffing boxes are shown in the drawing, but their number may be higher according to the connections extending to element 33.

The elements such as 31 and 32 and the boxes such as 34 are secured in place by a means such as a supple system of bonds, wedges and cross-pieces, not shown in the drawing, said means being carried by the walls of the ante-chambers, supple tubes and the center parts of the low pressure chamber.

Interconnecting means for the various elements of the amplifying apparatus are shown schematically at 37 and 38; the number of these internal connections is variable and dependent on the electric scheme of the repeater; they are immersed in the liquid.

Certain of these internal connections, such as the central conductors of the cores or their extensions, penetrate into chamber 21 through openings 39 and 40 analogous to opening 12 in Fig. 1.

The elements of the first category of the amplifying apparatus are arranged in chamber 21 that is filled with air under low pressure.

Fig. 5 shows a repeater having no common low pressure chamber.

A supple repeater might be produced by enrobing with a plastic sheathing, analogous to cylinder 140 as shown in Fig. 6, a supple tube 108 terminated by ante-chambers 110 and 112 as shown in Fig. 5, the insulating material of the cores being soldered to the plastic sheathing.

A number of gamuts of supple or rigid housings may be conceived having wholly thick, thin or partly thick and partly thin walls.

The several elements of the amplifying apparatus might also be arranged in one or more independent housings, said housings being, if desired, of identical or different types.

In all cases it will be of interest to provide the possibility of regulating certain elements of the amplifying apparatus, such as, for example, a potentiometer, by means of which the gain of the repeater may be set at a suitable value before the immersion takes place.

Such governing may be attained in various ways several of which will be indicated hereafter by way of example:

A first method of governing consists in demounting part of the repeater housing and acting directly on the element to be governed; in the case of a rigid repeater such as the one shown in Fig. 2, the elements to be governed are arranged in the ante-chamber 5 and access to these elements will be made possible by dismounting joint 7; if these elements are included in the second category governing will present no difficulties. If they are included in the first category, they are enclosed in small, thick walled boxes as hereabove described; governing may then be carried out in different ways, two of which are indicated hereafter: first of all the thick walled box is built to comprise as many connections as will be necessary and the governing will consist in suitably combining these connections together; the outlet of the connections is attained by means of devices already described; or else governing may be accomplished by means of a rod located at the bottom of a cut provided in the thick wall and extending into the interior of the box; the elements arranged in the box are governed by actuating the rod and the subsequent reconstitution of the thick wall is accomplished by filling in the cut with a matter ensuring the mechanical resistance and water tightness of the small box.

This method of governing the elements applies to certain cases, such as, for example, to the case of a rigid repeater carrying no armature, but, in other cases it may present certain difficulties, for example in the case of a supple armored repeater; the dismounting of the repeater housing may then necessitate dismounting of a part of the armature, a long and precarious job.

In the second method of governing no dismounting of the housing will be required. On the outer side of an ante-chamber or a supple tube is a control button or the head of a set screw, the shank of which passes through a stuffing box in the thin wall, analogous to those used for the entrance of the cores into the ante-chambers. The movements imparted at the outside of the repeater upon the screw head are transmitted to the interior, without necessitating dismounting of the housing. The thereby transmitted movements are made use of in governing the element that it is desired to adjust. If the element to be governed is located at a distance from the inner wall of the housing, the movement is transmitted by means of a supple or flexible mechanical connection, so as not to interfere with the deformations the supple housing may be subjected to. Once the governing has been accomplished, the stuffing box, through which the shank of the button or screw passes, is fully readjusted. By way of precaution the button or screw head is then covered with a cap fastened in such manner as to provide a waterproof connection, for example by soldering same to the outer wall of the housing.

An intermediate proceeding may consist in moving from the outer side of the housing a piece of iron located in the interior, by means of a magnet, said movement being made use of in attaining the desired governing action; this movement may, for example, be transmitted through the thin wall of one of the ante-chambers without having to pierce same.

The various repeaters as described hereabove are provided with suitable mechanical devices in view of their immersion; the delicate elements, more particularly the supple walls, are protected against shocks, corrosion, wear and tear etc., by suitable armors; the strains, due more particularly to the tension of the cable while being laid must not be supported by the repeater housings.

Up to this, the principles described hereabove were supposed to apply to submarine telephone receivers and coaxial cables; it is however to be understood that these principles may likewise apply to other apparatus that may be connected into a circuit as well as to various types of submarine cables and, more generally to any submarine apparatus fed by cable, and still more generally to any apparatus in which problems may arise analogous to those recited hereabove.

Part of the above discussed matter will now be described in connection with Figs. 5-16.

Referring first to Figure 5, it will be seen that the cable 100 having an outer conductor (not shown) an insulating core 102, and a central conductor 104 enters the flexible housing 106 of the repeater, say on the left hand side, and leaves same on the right hand side. The housing 106 consists of a middle portion 108 and two end portions 110 and 112 joined to the middle portion by junctions such as 114. The cable enters with its insulating core 102 and its central conductor 104 through an entrance piece 116 being designed with a stuffing box or gland 117 arranged at the entry of the end portion 110 and leaves the end portion 112 through a similar arrangement. The middle portion 108 and the end portions 110 and 112 are made of corrugated material and the inner space of the housing 106 is filled with a liquid of good electric insulating property which does not attack the elements arranged in the housing and to be described hereinafter, which wets the walls of the housing and does not freeze or unduly increase its viscosity at the temperatures prevailing at the bottom of the sea.

The outer conductor of the cable (not shown) does not enter the housing 106 but it may be connected to a metallic conductor (not shown) arranged at the outer wall of the housing 106 which, if desired, can be led through the wall of the housing 106 into the interior of same so that the potential of the outer conductor may be imparted to one or more of the elements of the repeater in the housing 106. A repeater generally indicated by 118 is arranged within the housing 106 and the liquid filling the same. A resistance coil 120 and an inductance coil 122 are shown to be arranged in direct contact with the liquid. An inductance coil 124 is shown arranged in a box 126 having thin and deformable walls and being filled with a liquid which can be different from the liquid filling the housing 106. Stuffing boxes 128 are provided for the connections connecting coil 124 to the resistance 120 and to a box 130 presently to be described. An interconnection 132 is shown which connects the junction of a central conductor 104 and the resistance 120 with the junction of the coil 124 and the box 130.

The boxes 130 and 132', the latter being shown in cross section, are housing elements of the repeater such as vacuum tubes which must be protected against the high pressure which prevails at the bottom of the sea and consequently within the housing 106. The boxes 130 and 132' are formed with thick walls and filled with air under low pressure. The outer dimensions of the boxes 130 and 132' are such as not to hinder the changes to which the shape of the middle portion 108 of the housing 106 may be subjected when the submarine cable is being put in place.

The electrical connections enter the boxes 130 and 132' through holes such as 134 which, in case the boxes consist of metal, may be filled with an insulating body or one consisting of glass or ceramic material. An interconnection 136 is shown in the drawing connecting one of the connections 138 between the boxes 130, 132' with the junction of the coil 122 and the cable 100 on the right hand side of the housing 106.

Referring now to Figure 6, the repeater is arranged in a housing 140 having tapering ends 142 and 144 through which the cable 146 enters and leaves. The housing 140 is filled with a paste or a plastic material 141. The elements of the repeater are arranged in boxes or housings 148, 150, 152, and 154, provided at intervals throughout the length of the cable 146. The housings 148, 150, 152 are completely encased by the plastic material 141 which is bonded to the insulation of the cable 146.

An interconnection 158 is shown which connects the entrance part of the cable 146 with one of the junctions 160 between the boxes 152 and 154. A conductor or earthing wire 162 leads from the outer conductor (not shown) of the cable 146 into the interior of the housing 140 and is connected at 164 to one of the junctions leading out of the box 150 and ends at 166 at the end of cable 146 leading out of the housing 140. The connections of the conductor 162 to the parts of the repeater inside the housing 140 may be different according to the requirements of the repeater. The outer conductor (not shown) on the entrance side and the exit side of the cable 146 has the potential of the sea water. Therefore it would be sufficient to connect a suitable wire 162 to the outer conductor of the cable 146 on one side of the housing 140 and let it penetrate into the paste or plastic material 141 filling the housing. For reasons of safety, however, it is preferable to provide several conductors such as 162 and to connect them to one or the other side of the cable. The earthing conductor 162 extends over a path in the material 141 filling the housing 140 and encasing the housings 148, 150, 152 which is substantially longer than the linear distance from the end of the housing 148 to the adjacent end of the material 141.

The arrangement of conductors such as 162 in Figure 6 may be carried out in different ways, a few embodiments of which are shown in Figures 7 to 12.

Referring first to Figures 7 to 9 of which Figures 8 and 9 are cross sections, respectively, along the lines 8 and 9 of the longitudinal section shown in Figure 7, it will be seen that the cable comprises a central conductor 170 which is surrounded by the insulating core 172 and the outer peripheral conductor 174 which terminates at 176 where it is soldered to several conductors such as 178, 180 and 182 which are arranged alongside the insulating core 172. The insulating core 172 and the conductors 178 to 182 are surrounded by a layer 186 consisting of an insulating substance. The structure consisting of the central conductor 170, the insulating core 172, the conductors 178, 180 and 182 and the insulating layer 184 penetrates into the plastic material 186 filling the housing 188 accommodating the repeater elements (not shown).

The part of the cable covered by the insulating layer 184 extends over a sufficient length to prevent the sea water from drifting along the wires 178 to 182 into the interior of the housing 188.

In Figures 7 to 9, the insulating and plastic materials are separated by cylindrical surfaces 190 and 192. It should be understood, however, that the insulating core 172, the insulating layer 184 and the plastic material 186 are joined to one another so that they form a continuous waterproof unit.

Figures 10 to 12 show another embodiment of the arrangement of the ground conductor, Figures 11 and 12 being cross sections along the lines 11—11 and 12—12, respectively, of Figure 10. The central conductor 170 and its insulating core 172 penetrate the housing 188 filled with a plastic material 186 as in the embodiment shown in Figures 7 to 9. The peripheral conductor 174 of the cable is joined at 176 to a plurality of conductors of which only one, 178, is shown in the drawing. The conductor 178 is embedded in an insulating material 194 both of which form a unit which penetrates through the housing 188 into the plastic material 186, to such a length that the sea water is prevented from flowing to the repeater elements (not shown) along the conductor 178.

Referring now to Figure 13, a repeater housing 106 is shown analogous to the housing 106 shown in Figure 5 and consisting of a corrugated mid-portion 108 and corrugated end portions 110 and 112, through which the cable 100 enters and leaves the housing 106. The cable consists of a central conductor 104, an insulating core 102, and an outer conductor (not shown). A sheath 200 consisting of a plastic material analogous to the material filling the housing 140 in Figure 6 is arranged so as to enclose the mid-portion 108 and the end portions 110 and 112 of the housing 106 and is bonded to the insulating core 102 of the cable 100. An earthing conductor 162 leads from the outer conductor (not shown) of the cable into the plastic material of the housing sheath corresponding to the material filling the housing in Figure 6 and extends over a path within the sheath 200 substantially longer than the linear distance from the end of the housing 106 to the adjacent end of the sheath 200.

Fig. 14 is a repetition of Figure 5 except that the earthing wire or return conductor is shown in Figure 14. The dielectric materials surrounding the central conductors 24 and 25 are denoted by 210 and 212, respectively. The return conductors of the cables are denoted by 214 and 216, respectively, and do not enter the ante chambers 26 and 27 of the supple tube 28. They are connected by means of metallic connections 218 and 220, respectively, to a metallic element of the tubular housing 28 from which the potentials of various elements of the apparatus are derived in accordance with the wiring diagram of the whole.

Another example of a wire connecting the peripheral conductors of the cable to various points of the apparatus is shown by the connection 162 in Figure 6 which leads in this example by means of the connections 164 to various points of the apparatus which are determined by the electric wiring diagram of the repeater.

Figure 15 differs from Figure 14 by the addition of a plastic sheathing 222 which is provided so as to enclose the supply tube 28 with the ante chambers 26 and 27 and is soldered to the dielectric materials 210 and 212 of the cable. The connections 218 and 220 extend over a substantial portion of their length within the plastic sheathing 222.

It is to be understood that an insulating liquid or plastic material fills the supple tube 28 in both Figures 14 and 15. The insulating material surrounds the central conductors 24, 25, the housings 126, 130 and 132' of the repeaters, the earthing wire as far as it is arranged within the supple tube and the other parts of the apparatus within the supple tube which are not shielded by the housings 126, 130 and 132'.

In Figure 16 a supple tube 224 contains several repeater apparatus arranged in housings such as 226, 228 and 230 to which the central conductors 232 and 234 of the cables 236 and 238 are connected. The tube is filled with a liquid or plastic insulator 240 and is surrounded by a plastic sheathing 242 which is soldered to the dielectric material 244 and 246 of the cables 236 and 238, respectively. The outer conductor 248 of the cable 231 is connected to an earthing wire 250 which extends over a considerable portion of the length thereof in the plastic sheathing 242 and is connected at suitable places such as 252 to a metal part of the supple tube 224 the inside of which is connected to various places such as 254 and 256 of the central conductor or the parts connecting the various repeater apparatus with one another.

It will be understood that each of the elements described above, or two or more together, may also find a useful application in other types of submarine cables, differing from the types described above.

While I have illustrated and described the invention as embodied in submarine cables combined with repeater apparatus, I do not intend to be limited to the details shown, since various modifications and structural changes may be made without departing in any way from the spirit of my invention.

What I claim as new and desire to secure by Letters Patent is:

1. In a submarine cable, in combination, a central conductor; a dielectric material insulating said central conductor; a repeater apparatus connected to said central conductor; a housing for said repeater apparatus; a plastic material filling said housing and bonded to said dielectric material; and an earthing wire enclosed by said dielectric material except at its outer end and extending over a path within said dielectric material substantially longer than the linear distance from the end of said housing to the adjacent end of said dielectric material.

2. In a submarine cable, in combination, a supple tube; a plastic sheathing surrounding said supple tube; a housing for a repeater apparatus arranged in said supple tube; a cable having a central conductor and a dielectric material enclosing a portion of the length of said central conductor; means for leading-in said central conductor stripped of said dielectric material into said housing; means for leading-in said dielectric material and said central conductor of said cable into said supple tube; and a deformable insulating material filling said supple tube and surrounding said housing and said central conductor within said supple tube.

3. In a submarine cable, in combination, a supple tube; a plastic sheathing surrounding said supple tube; a housing for a repeater apparatus arranged in said supple tube; a cable having a central conductor and a dielectric material enclosing a portion of the length of said central conductor, said dielectric material being bonded to said plastic sheathing; means for leading-in said central conductor stripped of said dielectric material into said housing; means for leading-in said dielectric material and said central conductor of said cable into said supple tube; and a deformable insulating material filling said supple tube and surrounding said housing and said central conductor within said supple tube.

4. In a submarine cable, in combination, a supple tube; a plastic sheathing surrounding said supple tube; a plurality of housings for repeater apparatus arranged in said supple tube; a cable having a central conductor and a dielectric material enclosing a portion of the length of said central conductor; means for leading-in said central conductor stripped of said dielectric material into said housings; means for leading-in said dielectric material and said central conductor of said cable into said supple tube; and a deformable, substantially non-compressible insulating material filling said supple tube and surrounding said housings and said central conductor within said supple tube.

5. In a submarine cable, in combination, a supple tube; a plastic sheathing surrounding said supple tube; a housing for repeater apparatus arranged in said supple tube; a cable having a central conductor, a dielectric material enclosing a portion of the length of said central conductor, and an outer conductor partly enclosing said dielectric material, said dielectric material being bonded to said plastic sheathing; means for leading-in said dielectric material and said central conductor of said cable into said supple tube; means for leading-in said central conductor stripped of said dielectric material into said housing; an earthing wire connecting said outer conductor to the repeater apparatus; and a deformable, substantially non-compressible insulating material filling said supple tube and surrounding said housing, said central conductor, and said earthing wire within said supple tube.

6. In a submarine cable, in combination, a supple tube; a plastic sheathing surrounding said supple tube; a housing for repeater apparatus arranged in said supple tube; a cable having a central conductor, a dielectric material enclosing a portion of the length of said central conductor, and an outer conductor partly enclosing said dielectric material, said dielectric material being bonded to said plastic sheathing; means for leading-in said dielectric material and said central conductor of said cable into said supple tube; means for leading-in said central conductor stripped of said dielectric material into said housing; an earthing wire extending over a substantial portion of the length thereof within said plastic sheathing and connecting said outer conductor to the repeater apparatus; and a deformable, substantially non-compressible insulating material filling said supple tube and surrounding said housing, said central conductor, and said earthing wire within said supple tube.

7. In a submarine cable, in combination, a supple tube; a plastic sheathing surrounding said supple tube; a plurality of housings for repeater apparatus arranged in said supple tube; a cable having a central conductor, a dielectric material enclosing a portion of the length of said central conductor, and an outer conductor partly enclosing said dielectric material, said dielectric material being bonded to said plastic sheathing; means for leading-in said dielectric material and said central conductor of said cable into said supple tube; means for leading-in said central conductor stripped of said dielectric material into said housings; an earthing wire connecting said outer conductor to the repeater apparatus; and a liquid insulating material filling said supple tube and surrounding said housings, said central conductor, and said earthing wire within said supple tube.

8. In a submarine cable, in combination, a supple tube; a plastic sheathing surrounding said supple tube; a plurality of housings for repeater apparatus arranged in said supple tube; a cable having a central conductor, a dielectric material partly enclosing said central conductor, and an outer conductor partly enclosing said dielectric material, said dielectric material being bonded to said plastic sheathing; means for leading-in said dielectric material and said central conductor of said cable into said supple tube; means for leading-in said central conductor stripped of said dielectric material into said housings; an earthing wire extending over a substantial portion of the length thereof within said plastic sheathing and connecting said outer conductor to the repeater apparatus; and a liquid insulating material filling said supple tube and surrounding said housings, said central conductor, and said earthing wire within said supple tube.

9. In a submarine cable, in combination, a supple tube; at least one housing for a repeater apparatus arranged in said supple tube; a cable having a central conductor and a dielectric material enclosing a portion of the length of said central conductor; fluid-tight means for leading-in said dielectric material and said central conductor of said cable into said supple tube; means for leading-in said central conductor stripped of said dielectric material into said housing; and an insulating liquid filling said supple tube and surrounding said housing and said central conductor within said supple tube.

10. In a submarine cable, in combination, a supple tube; at least one fluid-tight housing for a repeater apparatus arranged in said supple tube; a cable having a central conductor and a dielectric material enclosing a portion of the length of said central conductor; fluid-tight means for leading-in said dielectric material and said central conductor of said cable into said supple tube; means for leading-in said central conductor stripped of said dielectric material into said fluid-tight housing; and an insulating liquid filling said supple tube and surrounding said fluid-tight housing and said central conductor within said supple tube.

11. In a submarine cable, in combination, a supple tube; at least one fluid-tight housing for a repeater apparatus consisting of metal and arranged in said supple tube; a cable having a central conductor and a dielectric material enclosing a portion of the length of said central conductor; fluid-tight means for leading-in said dielectric material and said central conductor of said cable into said supple tube; means for leading-in said central conductor stripped of said dielectric material into said fluid-tight housing; and an insulating liquid filling said supple tube and surrounding said fluid-tight housing and said central conductor within said supple tube.

12. In a submarine cable, the combination with a central conductor insulated with dielectric material, of repeater apparatus provided at intervals throughout the length of the conductor, a housing for each repeater, a sheath of dielectric material completely encasing the housing and bonded to the cable insulation, and an earthing wire enclosed by the housing sheath except at its outer end and extending over a path within said sheath substantially longer than the linear distance from the end of the housing to the adjacent end of the sheath, and a filling material in said housing.

13. In a submarine cable, the combination with an intermittently loaded conductor, each loading consisting of repeater devices, an insulation layer of dielectric material extending over the cable, a housing for each repeater device provided with a sheath of dielectric material, said sheath being unitary with the insulation layer of the conductor, and an earthing wire enclosed by the housing sheath except at its outer end and extending over a path within said sheath substantially longer than the linear distance from the end of the housing to the adjacent end of the sheath, and a filling material in said housing.

14. In a submarine cable, in combination, a tube, said tube being both supple and capable of being compressed throughout its entire length; housing means for housing repeater apparatus arranged in said tube; two cable sections each having a central conductor and a dielectric material enclosing a portion of the length of said central conductor; means for leading-in the dielectric material and central conductor of one of said cable sections into said tube through one of its ends and for leading-in the dielectric material and central conductor of the other of said cable sections into said tube through the other of its ends; means for leading-in both of said central conductors stripped of dielectric material into said housing means; and a deformable insulating material filling said tube and surrounding said housing means and said central conductors within said tube.

References Cited in the file of this patent

UNITED STATES PATENTS

| | | |
|---|---|---|
| 2,110,457 | Wentz | Mar. 8, 1938 |
| 2,306,331 | Elmer | Dec. 22, 1942 |
| 2,312,652 | Komives et al. | Mar. 2, 1943 |
| 2,465,069 | Dean et al. | Mar. 22, 1949 |
| 2,471,046 | Smith et al. | May 24, 1949 |
| 2,471,468 | Weston | May 31, 1949 |
| 2,539,310 | Martin | Jan. 23, 1951 |

FOREIGN PATENTS

| | | |
|---|---|---|
| 383,509 | Great Britain | Nov. 17, 1932 |